Nov. 15, 1955
W. E. GERMER
2,723,559
APPARATUS FOR DETERMINING OPTIMUM
OPERATION OF A HEATING PLANT
Filed Oct. 9, 1951
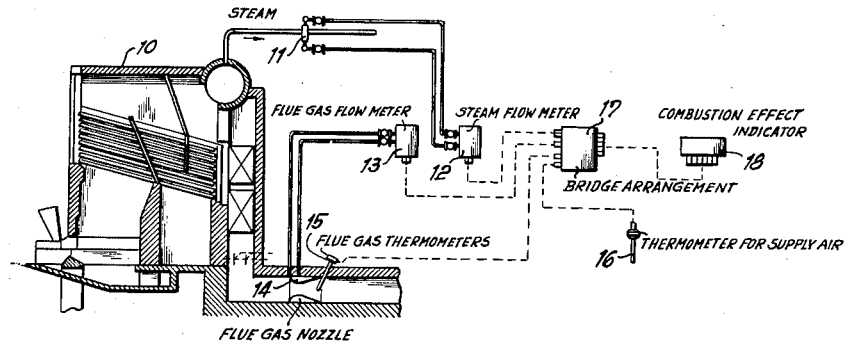
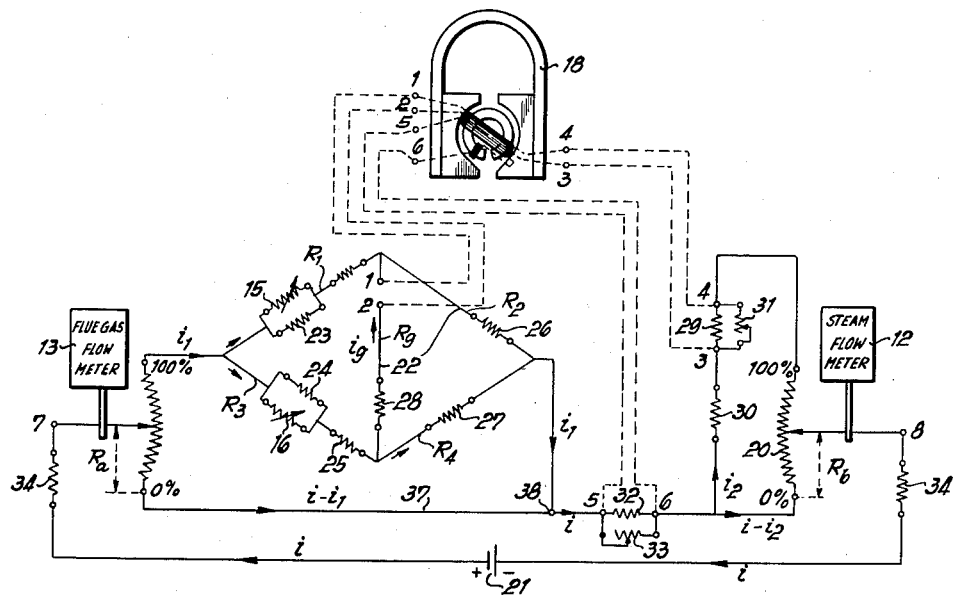
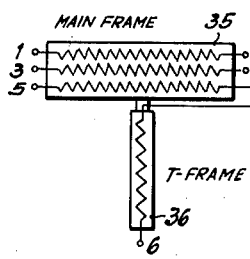
INVENTOR
Wilhelm E. GERMER
BY
ATTORNEY

United States Patent Office 2,723,559
Patented Nov. 15, 1955

2,723,559

APPARATUS FOR DETERMINING OPTIMUM OPERATION OF A HEATING PLANT

Wilhelm Eduard Germer, Dusseldorf, Germany

Application October 9, 1951, Serial No. 250,549

1 Claim. (Cl. 73—112)

The instant invention relates to apparatus for operating a boiler at its maximum possible efficiency at all times.

It is an object of the instant invention to provide means for more accurately and continuously determining the efficiency of operation of a heating plant by accurate control of the heat generated by the fuel in the form of useful heat and exhaust or flue gas heat.

It is a further object of my invention to provide electrical circuit means for continuously measuring the useful heat and flue gas heat components, the circuit means including an indicating device calibrated for the direct reading of the instantaneous sum of such components in terms of complete combustion effect.

As is well known, optimum efficiency in the operation of a boiler depends on so controlling the fuel supply and the supply of air supporting its combustion that the fuel is converted to the maximum extent possible into useful heat. The prerequisite is that adequate air is available in burning the fuel so that all of the fuel participates in the combustion and is completely consumed thereby. An excessive supply of air in support of the combustion results in undesirable increased flue gas heat, whereas an inadequate supply of air results in but partial combustion of the fuel with a portion of the fuel remaining unburnt or but partially burned. It is obvious that optimum operation of a boiler lies at the region at which partial combustion and complete combustion adjoin. Heretofore, boiler operators have sought to maintain heating plants at this optimum region by using flue gas analyzers, indicating the $CO_2$ and the $CO_2+H_2$ content of the flue gas, and maintaining the flue gas at a high $CO_2$ percentage in the complete absence of unburnt gases therein. Flue gas analyzers, however, require accurate and careful supervision, and at best are inaccurate and unreliable in that but very small samples of the total flue gas are taken for their operation.

The instant invention overcomes the difficulties inherent in prior methods and apparatus by measuring, for a given quality and quantity of fuel, the useful heat $E_1$ and the flue gas heat $E_2$, and from such measurements made with varying amounts of air, from excess to inadequate, determining when the useful heat delivered stops increasing and commences to decrease. The point or region at which the useful heat, for example in the generated steam, so measured is a maximum is thus the point at which, for the given quality and quantity of fuel, the particular boiler is operating at maximum efficiency.

The instant invention is based on the following considerations: Let $E_1$ designate the useful heat component of the energy $E$ released on complete combustion of the fuel, $E_2$ the flue gas heat component, and $E_3$ the heat component dissipated by conduction and radiation, then the following relation applies: $E = E_1 + E_2 + E_3$ in kilocalories per second. The conduction and radiation heat component $E_3$ for large boilers amounts to about 1%, to about from 2% to 3% for medium size boilers, and to about 3% to 5% for small boilers. Since for the range from weak to full load, this heat component $E_3$, obviously a loss, varies only some 0.25% for large boilers and some 1.0% for medium size and small boilers, a mean constant value therefore can be used, the constant $k$ depending on the type and size of the boiler. Hence the useful heat component $E_1$ and the flue gas heat component together may be considered as a constant $k$ of the total energy developed, and we can write $$E = \frac{E_1 + E_2}{k} \text{ kilocalories per second} \quad (1)$$

Both $E_1$ and $E_2$ are quantities which can readily be measured, and are the variables appearing alone in Equation 1; the latter thus appears most useful since neither the quantity nor the specific heating value of the used fuel need be known.

In the method of my instant invention, the optimum combustion effect possible in a given boiler installation using a given quality and quantity of fuel is readily determined by thoroughly intermingling the given quantity of fuel with an excessive supply of air to assure complete combustion of the fuel. The flue gas heat component and the useful heat component are each measured for such excessive air supply and then the air supply is cut down in successive stages. At each of the stages both the flue gas and the useful heat components are measured. It will be at once noted as the supply of air is cut down from excessive the flue gas heat component decreases and the useful heat component increases, both up to a certain point beyond which, on further throttling of the air supply, the useful heat component will decrease. Since, as above shown by Equation 1, the sum of the flue gas and the useful heat components is a constant for complete fuel combustion, this point is at the border between complete and incomplete combustion. Below such point not all of the given quantity of fuel is burned, or completely burned, and having reached that point the air supply is restored to that amount for which the highest useful heat component $E_1$ was observed. The method of the instant invention is exactly the same when, for example due to a change in the load, the quantity of fuel of the same quality requires to be changed, or when a fuel of different quality is to be used in the combustion.

In an illustrative embodiment of apparatus for using the method of my instant invention, the flue gas flow and the steam flow are measured by appropriate meters, converted into electrical variable magnitudes connected in a circuit, and magnitudes representative of each measurement applied to a single indicating means of which the scale is calibrated in accordance with Equation 1. The steam flow meter therein employed is used without any correcting element for changes in the steam temperature, the steam here being the useful heat. The flue gas flow meter is preferably of the differential pressure type with its orifices extending into the flue of the exhaust gas and is provided with temperature correction with the aid of two resistance thermometers, one measuring the flue gas temperature and the other the supply air temperature. Each flow meter is mechanically interconnected with the sliding contact of a voltage divider, a source of electrical potential being in series with the two sliding contacts. The electrical circuit interconnections between the end terminals of the voltage divider are so disposed that the partial currents in the one branch of each divider connected to the end terminal thereof corresponding to maximum steam and flue gas flow, respectively, are always proportional to the instantaneous flow through the particular flow meter at each position of the sliding contact moved by the particular flow meter.

In employing the differential pressure type of flue gas flow meter, consideration must be taken of the fact that it has no correcting element for changes in flow measurement due to changes in temperature of the flue gas from the temperature at which the flow meter was calibrated. Taking this temperature correction factor into account, Equation 1 becomes $$E = \frac{E_1 + G(t_g - t_1) C_{pm} \sqrt{\frac{273 + t_{go}}{273 + t_g}}}{k} \quad (2)$$

wherein:

G is the total flue gas flow in normal cubic meters per second;

$t_g$ is the flue gas temperature in degrees centigrade;

$t_{go}$ is the flue gas temperature in degrees centigrade at calibration of the flow meter;

$t_1$ is the supply air temperature in degrees centigrade;

$C_{pm}$ is the mean specific heat of the flue gases between 0° C. and $t_g$° C. in kilocalories per normal cubic meter;

and "normal cubic meter" is the volume in cubic meters at 0° C., and 760 mm. of mercury.

In the circuit arrangement of the illustrative embodiment, the flow of the flue gas, the temperature of the flue gas and the temperature of the supply air, are all represented electrically in a bridge connected to the fixed terminal corresponding to maximum flue gas flow of the divider of which the sliding contact is actuated by the flue gas flow meter. Currents representative of $E_1$, the useful heat, and of $E_2$, the corrected flue gas heat, are applied to an electrical quotient meter having a plurality of driving coils, the electrical meter continuously indicating the instantaneous sum thereof.

The instant invention will be more clearly understood from the following detailed description of the illustrative embodiment taken in conjunction with the accompanying drawing in which:

Figure 1 shows the general arrangement of an installation embodying my instant invention, partially in section and partially in block schematic and highly simplified;

Figure 2 shows the electrical circuit schematic interconnecting the flow meters and thermometers, including the electrical indicating meter; and Figure 3 is a highly simplified schematic of the coils and common core of the indicating meter.

Boiler installation 10 has an orifice 11 in the steam line to supply the steam flow meter 12, and a nozzle 14 in the exhaust gas line to supply the flue gas flow meter 13. Flue gas thermometer 15 projects into the exhaust line and electrically responds by a change in its resistance to temperature changes in the exhaust line, being positioned close to nozzle 14, while thermometer 16 is similarly responsive to temperature changes in the air supplied to the boiler combustion chamber. Each of the flow meters 12 and 13, and each of the resistance thermometers 15 and 16, is connected, the former indirectly by way of potential dividers 19 and 20, the latter directly, into an electric circuit 17 which includes a source of direct current potential, preferably of about 24 volts, the electric circuit being adapted continuously to actuate indicating meter 18 to show the instantaneous "combustion effect," that is, the sum of the flue gas and the steam heat components.

Each flow meter, 12 and 13, has its operating member mechanically interlinked with the movable sliding contact, 7 and 8, of a current divider, 19 and 20, individual to the particular flow meter, as indicated in the circuit schematic of Figure 2. A source of D. C. potential 21 is connected between the contacts 7 and 8, and in the divided or branch circuit connected to the terminal of divider 19 representative of the maximum flue gas flow, a Wheatstone bridge 22 is disposed. The divider terminals representative of zero flue gas flow and zero steam flow are interconnected with each other by the conductor 37, bridge 22 reconnecting with conductor 37 at point 38. Since the total current $i$ flowing between the contacts 7 and 8 of the dividers 19 and 20 changes in magnitude with the output of each of the flow meters 12 and 13, the partial currents $i_1$ and $i_2$ will change in magnitude according to the output of the relative flow meters and to the changes of the total current $i$. The relation of the magnitude of partial currents $i_1$ and $i_2$ to the total current $i$ will, however, always agree exactly with the relation of the output of each of the flow meters to their maximum flow values.

Partial current $i_1$, applied to the bridge 22, furnishes the current $i_g$, representative of the flue gas heat component $E_2$, to the indicating meter 18 combination of the fixed magnitudes positioned in the bridge arms coupled with the variable magnitudes representative of the temperature changes read by thermometers 15 and 16. Since the mean specific heat of the flue gases may be taken as a constant, to obtain the measuring current representative of $E_2$ current $i_1$ has to be multiplied by the temperature factor, $$(t_g - t_1) \sqrt{\frac{273 + t_{go}}{273 + t_g}}$$

(from Equation 2 above), to produce representative current $i_g$. Since the numerator within the radical represents the temperature correcting factor for the flue gas flow measurement, the two variables, $t_g$ and $t_1$, of the factor readily lend themselves to insertion in two bridge arms of representative variable resistance values, and the remaining magnitudes of the fixed elements of the bridge are readily computed.

The four arms of bridge 22 consist, respectively, of the fixed resistance 23 in shunt of the variable resistance of the flue gas thermometer 15 in arm $R_1$; fixed resistance 24 in parallel to the variable resistance of supply air thermometer 16 and a series resistance 25 for adjustment purposes, in arm $R_3$; fixed resistance 26 in arm $R_2$; and fixed resistance 27 in arm $R_4$. The bridge diagonal from the common point of arms $R_1$ and $R_2$ to the common point of arms $R_3$ and $R_4$, includes the resistance of one coil, 1, 2, of the indicating meter 18 and a series fixed resistance 28. Fixed resistances 23, 24, 25, 27 and 28 are of such predetermined magnitudes that the current $i_g$ flowing in the diagonal is proportional to the feeding current $i_1$ times the temperature factor. Thus there is applied to indicator 18 a current proportional to the flue gas heat component $E_2$.

Connected across the end terminals of divider 20, of which sliding contact 8 is actuated by the steam flow meter 12, are fixed resistances 29 and 30, resistance 29 having connected in parallel thereto a second coil 3, 4 of the indicating meter 18. Resistance 29 is also shunted by a rheostat 31 which permits of fine adjustment of the magnitude of partial current $i_2$, representative of the instantaneous steam heat component $E_1$, applied to the second coil 3, 4.

The moving coil arrangement of indicating meter 18 is schematically shown in Figure 3 and consists of two main coils, 1, 2 and 3, 4, and a smaller T-coil 5, 6 of which one leg is at right angles to the two main coils and centrally thereof, the three coils reacting with a common core and magnet system. Coil 1, 2 is adapted to be connected to the above described diagonal of bridge 22 and hence is traversed by current $i_g$ which is proportional to $E_2$, while coil 3, 4 receives partial current $i_2$ which is proportional to $E_1$. While the two currents are isolated from each other, they act on the unitary indicating frame of the common magnetic system with additive effect, and hence the sum of the two currents is indicated. Currents $i_g$ and $i_2$ thus both tend to move the indicator of meter 18 to the maximum deflection possible. The spring ordinarily used in indicating meters in opposition to such tendency of the currents being measured, is replaced by a third current applied to meter 18; this third current is proportional to $i$, the total current of the electrical circuit of Figure 2, and is applied to T-coil 5, 6. This third measuring current proportional to $i$, is taken from across the terminals of a resistance 32 in the portion of conductor 37 between the divider networks 19 and 20, a rheostat 33 in parallel to resistance 32 permitting adjustment of the total current $i$ applied to T-coil 5, 6. The T-coil is insulated from the other two coils of meter 18 and has a few windings parallel to the turns of the main coils in additive direction therewith, while the remainder of the T-coil windings, at right angles to such few windings and the turns of the two main coils, is in such direction that its turning torque on the frame is in opposition to that resulting from currents $i_g$ and $i_2$. Obviously the magnitude of current $i$ can be varied by changing the magnitude of resistance 32 and of rheostat 33.

When the sliding contacts 7 and 8 under control of the respective flow meters 12 and 13 are in the position of maximum displacement, that is, are on the terminals at the divider ends representative of maximum flue gas and steam flow, the maximum value of the sum $E_1+E_2$ should obviously be indicated by meter 18. With the sliding contacts in such position, current $i$ is thus adjusted so that such maximum is indicated by the meter 18. Serially connected in the conductor interconnecting the sliding contacts 7 and 8 and the potential source 21, two fixed resistances 34 of equal magnitude are provided for the purpose of giving current $i$ a finite value when the sliding contacts are displaced to rest on the minimum steam and flue gas flow, end terminals of the dividers.

It follows quite clearly from Figure 2 that when the sliding contacts are on the minimum flow, end terminals of the dividers, current $i$ is a maximum. With increasing displacement of the sliding contacts by the actuation of their connected flow meters, current $i$ will progressively decrease from such maximum to a minimum value which is about 60% of such maximum in the illustrative embodiment. Notwithstanding the continually changing value of $i$ with sliding contact displacement, the indication of the sum $E_1+E_2$ by meter 18 will be unaffected as the size of each measuring current will vary proportionately in the same direction. Thus, if $R_5$ be the total resistance of divider 19 and $R_6$ that of divider 20, it follows that $$i_1 = \frac{R_a}{R_5} i$$

and $$i_2 = \frac{R_b}{R_6} i$$

But, as above described, the reading of meter 18 depends on $$\frac{i_1+i_2}{i}$$

which on substitution of the values for $i_1$ and $i_2$ becomes $$\frac{i_1+i_2}{i} = \frac{i\left(\frac{R_a}{R_5}+\frac{R_b}{R_6}\right)}{i} = \frac{R_a}{R_5}+\frac{R_b}{R_6}$$

and the indication is independent of the particular value of $i$.

I claim:

Direct reading indicator for the energy developed on combustion of fuel and air in a combustion chamber comprising a source of electrical potential, a pair of voltage dividers each having fixed end terminals and an intermediate slidable terminal, the source of potential interconnecting the intermediate slidable terminals, means for measuring the flow of flue gas from the combustion chamber, means interconnecting the slidable terminal of one of the pair of voltage dividers with the flue gas flow measuring means to actuate the slidable terminal between the fixed end terminals in accordance with the flow, means for measuring the steam flow from the combustion chamber, means interconnecting the slidable terminal of the other of the pair of voltage dividers with the steam flow measuring means to actuate the slidable terminal between the fixed end terminals in accordance with the steam flow, a conductive connection between the fixed end terminal of one divider corresponding to zero flow indication of the flow meter actuating the slidable terminal of the one divider with the corresponding fixed end terminal of the other divider, a first branch circuit including a Wheatstone bridge connected between the other fixed end terminal of the divider of which the slidable terminal is actuated by the flue gas flow measuring means and a first point in the conductive connection, the bridge containing a first pair of arms each having a variable resistance, a temperature responsive device subjected to the flue gas temperature to correspondingly control one of the variable resistances, a temperature responsive device subjected to the air supply to the chamber to correspondingly control the other of the variable resistances, a second pair of arms each including a resistance of predetermined magnitude, and a diagonal between the common points of an arm of the first pair and an arm of the second pair, a second branch circuit connected to the other fixed end terminal of the divider of which the slidable terminal is connected to the steam flow measuring means and to a second point in the conductive connection, the second point being between the first point on the conductive connection and the fixed end terminal of the divider of which the slidable terminal is connected to the steam flow measuring means, a resistor interposed in series between the first and second points, and an indicating meter having three coils, the first of the three coils being in the diagonal of the Wheatstone bridge and adapted to receive therefrom a current representative of the flue gas heat component, the second coil being connected to the second branch circuit and disposed in additive relation to the first coil and adapted to receive from the second branch circuit a current representative of the steam heat component, and the third coil being connected in shunt across the resistor between the first and second points and so disposed in the meter as to partially oppose the effect of the first and second coils on the reading of the indication meter.

References Cited in the file of this patent

UNITED STATES PATENTS

| 1,730,541 | Spitzglass | Oct. 8, 1929 |
| 2,283,745 | Lines | May 19, 1942 |
| 2,305,769 | Germer | Dec. 22, 1942 |
| 2,360,347 | Hotchkiss | Oct. 17, 1944 |

FOREIGN PATENTS

| 471,819 | Great Britain | Sept. 13, 1937 |